United States Patent
Song et al.

(10) Patent No.: US 11,817,996 B2
(45) Date of Patent: *Nov. 14, 2023

(54) IN-SITU OAM TRACE TYPE EXTENSION WITH CASCADE BITMAP AND SEGMENT IN-SITU OAM

(71) Applicant: Futurewei Technologies, Inc., Plano, TX (US)

(72) Inventors: Haoyu Song, San Jose, CA (US); Tianran Zhou, Beijing (CN)

(73) Assignee: Futurewei Technologies, Inc., Addison, TX (US)

(*) Notice: Subject to any disclaimer, the term of this patent is extended or adjusted under 35 U.S.C. 154(b) by 36 days.

This patent is subject to a terminal disclaimer.

(21) Appl. No.: 17/355,989

(22) Filed: Jun. 23, 2021

(65) Prior Publication Data

US 2021/0320840 A1 Oct. 14, 2021

Related U.S. Application Data

(63) Continuation of application No. 16/848,674, filed on Apr. 14, 2020, now Pat. No. 11,063,817, which is a continuation of application No. 15/975,459, filed on May 9, 2018, now Pat. No. 10,666,506.

(60) Provisional application No. 62/505,442, filed on May 12, 2017, provisional application No. 62/505,407, filed on May 12, 2017.

(51) Int. Cl.
*H04L 41/08* (2022.01)
*H04L 12/54* (2022.01)
*H04L 1/1607* (2023.01)
*H04L 41/00* (2022.01)
*H04L 12/70* (2013.01)

(52) U.S. Cl.
CPC .......... *H04L 41/08* (2013.01); *H04L 1/1614* (2013.01); *H04L 12/56* (2013.01); *H04L 41/26* (2013.01); *H04L 2012/5625* (2013.01)

(58) Field of Classification Search
CPC ....... H04L 41/08; H04L 1/1614; H04L 12/56; H04L 41/26; H04L 2012/5625
See application file for complete search history.

(56) References Cited

U.S. PATENT DOCUMENTS

2003/0217138 A1 11/2003 Shimba et al.
2003/0227399 A1* 12/2003 Varanasi ............... H03M 5/145
341/59

(Continued)

OTHER PUBLICATIONS

Postel, J., "DARPA Internet Program Protocol Specification," RFC 0791, Sep. 1981, 51 pages.

(Continued)

*Primary Examiner* — Kiet Tang
(74) *Attorney, Agent, or Firm* — Conley Rose, P.C.

(57) ABSTRACT

The disclosure relates to technology for sending network management information in a network. A source edge node modifies data packets by encapsulating an operations, administration and maintenance (OAM) header in the data packets traversing a data path, and the OAM header includes a first indicator field. The source edge node also inserts a segment size field into the OAM header of the data packets based on an indication by the first indicator field, the segment size field indicating the data path is partitioned into segments based on a value of the segment size field.

20 Claims, 8 Drawing Sheets

(56) References Cited

U.S. PATENT DOCUMENTS

| | | | | |
|---|---|---|---|---|
| 2007/0053298 A1* | 3/2007 | Ke | ........................ | H04L 45/10 |
| | | | | 370/236.2 |
| 2008/0253299 A1* | 10/2008 | Damm | ................... | H04L 43/50 |
| | | | | 370/252 |
| 2010/0177733 A1* | 7/2010 | Yi | ........................ | H04W 80/02 |
| | | | | 370/331 |
| 2014/0140228 A1* | 5/2014 | Dayanandan | ......... | H04L 69/324 |
| | | | | 370/252 |
| 2018/0278548 A1* | 9/2018 | Pignataro | ............... | H04L 43/08 |

OTHER PUBLICATIONS

Mizrahi, T., et al., "An Overview of Operations, Administration, and Maintenance (OAM) Tools," RFC 7276, Jun. 2014, 53 pages.
Morton, A., "Active and Passive Metrics and Methods (with Hybrid Types In-Between)," RFC 7799, May 2016, 14 pages.
Brockners, F., et al., "Data Fields for In-situ OAM," draft-brockners-inband-oam-data-04, Mar. 29, 2017, 25 pages.
Brockners, F., et al., "Requirements for In-situ OAM," draft-brockners-inband-oam-requirements-03, Mar. 13, 2017, 24 pages.

* cited by examiner

IN-SITU OAM TRACE TYPE EXTENSION WITH CASCADE BITMAP AND SEGMENT IN-SITU OAM

CROSS-REFERENCE TO RELATED APPLICATIONS

This application is a continuation of U.S. application Ser. No. 16/848,674 filed on Apr. 14, 2020, by Haoyu Song, et al., and titled "In-situ OAM Trace Type Extension with Cascade Bitmap and Segment In-situ OAM," which is a continuation of U.S. application Ser. No. 15/975,459 filed on May 9, 2018, by Haoyu Song, et al., and titled "In-situ OAM Trace Type Extension with Cascade Bitmap and Segment In-situ OAM," which claims the benefit of U.S. Provisional Application No. 62/505,407 filed on May 12, 2017, by Haoyu Song, et al., and titled "In-Situ OAM Trace Data Type Extension With Cascade Bitmap" and U.S. Provisional Application No. 62/505,442 filed on May 12, 2017, by Haoyu Song, et al., and titled "Segment In-Situ OAM," each of which is hereby incorporated by reference.

TECHNICAL FIELD

The present disclosure is generally related to communication networks and, more particularly, to Operation, Administration and Maintenance (OAM) domains and an OAM frame format.

BACKGROUND

Data communication networks may include various computers, servers, nodes, routers, switches, bridges, hubs, proxies, and other network devices (generically referred to as network elements) coupled together and configured to pass data to one another. Data is communicated through the data communication network by passing protocol data units, such as frames, packets, cells, or segments, between the network elements. The various network elements on the communication network communicate with each other using protocols. Different protocols are used to administer different parts of the communication, such as instructing the network elements how to route information.

As networking technology has evolved, Ethernet has become an increasingly important technology across various segments of networks, including local area networks (LANs), metropolitan area networks (MANs), and wide-area networks (WANs). However, Ethernet does not allow certain OAM operations to occur, thereby limiting the ability to manage and diagnose problems on the network. In some instances, the lack of OAM support in Ethernet prevents the network provider from taking measurements to perform fault detection, isolation, confirmation, and many other operations that a network provider or subscriber may wish to be able to do on the network.

SUMMARY

According to one aspect of the present disclosure, there is provided a method of sending network management information in a network, comprising modifying, by a source edge node, data packets by encapsulating an operations, administration and maintenance (OAM) header in the data packets traversing a data path, wherein the OAM header includes a first indicator field; and inserting, by the source edge node, a segment size field into the OAM header of the data packets based on an indication by the first indicator field, the segment size field indicating the data path is partitioned into segments based on a value of the segment size field.

Optionally, in any of the preceding aspects, the method further comprising inserting, by the source edge node, a node data list field in the OAM header that stores data collected at each hop in the segments of the data path in the network, each of the segments in the data path having a number of hops as defined by the value in the segment size field in the OAM header.

Optionally, in any of the preceding aspects, wherein the OAM header further includes a remaining hop count field, and the data collected at each hop in the segments of the data path is sent to a collection entity when a value of the remaining hop count field is zero.

Optionally, in any of the preceding aspects, wherein the segment size field and the remaining hop count field comprise a third byte of a first word of the OAM header, and the segment size field and the remaining hop count field are partitioned into two 4-bit fields.

Optionally, in any of the preceding aspects, wherein the data path is partitioned into fixed size segments based on the value of the segment size field.

Optionally, in any of the preceding aspects, wherein a value of the segment size field and the value of the remaining hop count field are equal.

Optionally, in any of the preceding aspects, wherein at each hop in the segments of the data path the value in the remaining hop count field is decremented.

Optionally, in any of the preceding aspects, wherein the OAM header further includes a flag field, the first indicator field is in the flag field, and the first indicator field indicates that the OAM header is a segment OAM header.

Optionally, in any of the preceding aspects, wherein the OAM header further includes a data type bitmap field having a second indicator, the second indicator is in the data type bitmap field, and the second indicator indicates that the OAM header is an extended OAM header.

Optionally, in any of the preceding aspects, wherein a first node data list field includes data from a last node in the data path and a last node data list field includes data from a first node in the data path.

According to still one other aspect of the present disclosure, there is a node for sending network management information in a network, comprising a non-transitory memory storage comprising instructions; and one or more processors in communication with the memory, wherein the one or more processors execute the instructions to modify data packets by encapsulating an operations, administration and maintenance (OAM) header in the data packets traversing a data path, wherein the OAM header includes a first indicator field; and insert a segment size field into the OAM header of the data packets based on an indication by the first indicator field, the segment size field indicating the data path is partitioned into segments based on a value of the segment size field.

According to one other aspect of the present disclosure, there is provided a method of sending network management information in a network, comprising modifying, by a source edge node, data packets by encapsulating an operations, administration and maintenance (OAM) header in the data packets traversing a data path, wherein the OAM header includes a segment size, a remaining hop count and one or more node data lists; partitioning the data path into fixed segment sizes and setting the remaining hop count to be equal to the fixed segment sizes; collecting data at each node in the data path for each of the fixed segment sizes; storing the collected data in each of the fixed segment sizes in a corresponding one of the node data lists; decreasing the remaining hop count at each node in the data path as the data packet traverses the data path of each of the fixed segment sizes; extracting the node data lists collected in the data path of each of the fixed segment sizes; and reporting the extracted node data lists to a collection entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to communication networks and, more particularly, to Operation, Administration and Maintenance (OAM) domains and an OAM frame format.

In-situ OAM (IOAM) data is added to a packet upon entering the IOAM domain and is removed from the data packet when exiting the IOAM domain. IOAM data fields are added to or removed from traffic (i.e., data packets traversing the network) by the nodes (or elements) which form the edge of a domain (e.g., source edge node or router). Within the IOAM domain, the IOAM data may be updated by network elements that the data packet traversed. As data packets traverse the network, tracing data is collected at every node. However, the types of data to be collected is limited by the Base Trace Type defined in the IOAM header, which currently allows for eleven data types and associated formats, along with five extra bits to identify new types of data. Moreover, the space in the IOAM header may be limited such that the amount of data in the network cannot be properly retained in the node data list of the IOAM header.

In one embodiment, the last bit of the trace type bitmap is used to indicate the existence of additional (or extended) bitmap(s). Using these extended bitmaps, the data types supported by the IOAM header may also be extended.

In another embodiment, the data path is partitioned into fixed size segments and the IOAM packets collect data from the nodes within a segment. At the end of a segment, the data is stripped off and reported to the collection entity, such as a management plane, and the IOAM packet may be used again at another (next) segment in the data path to collect data.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
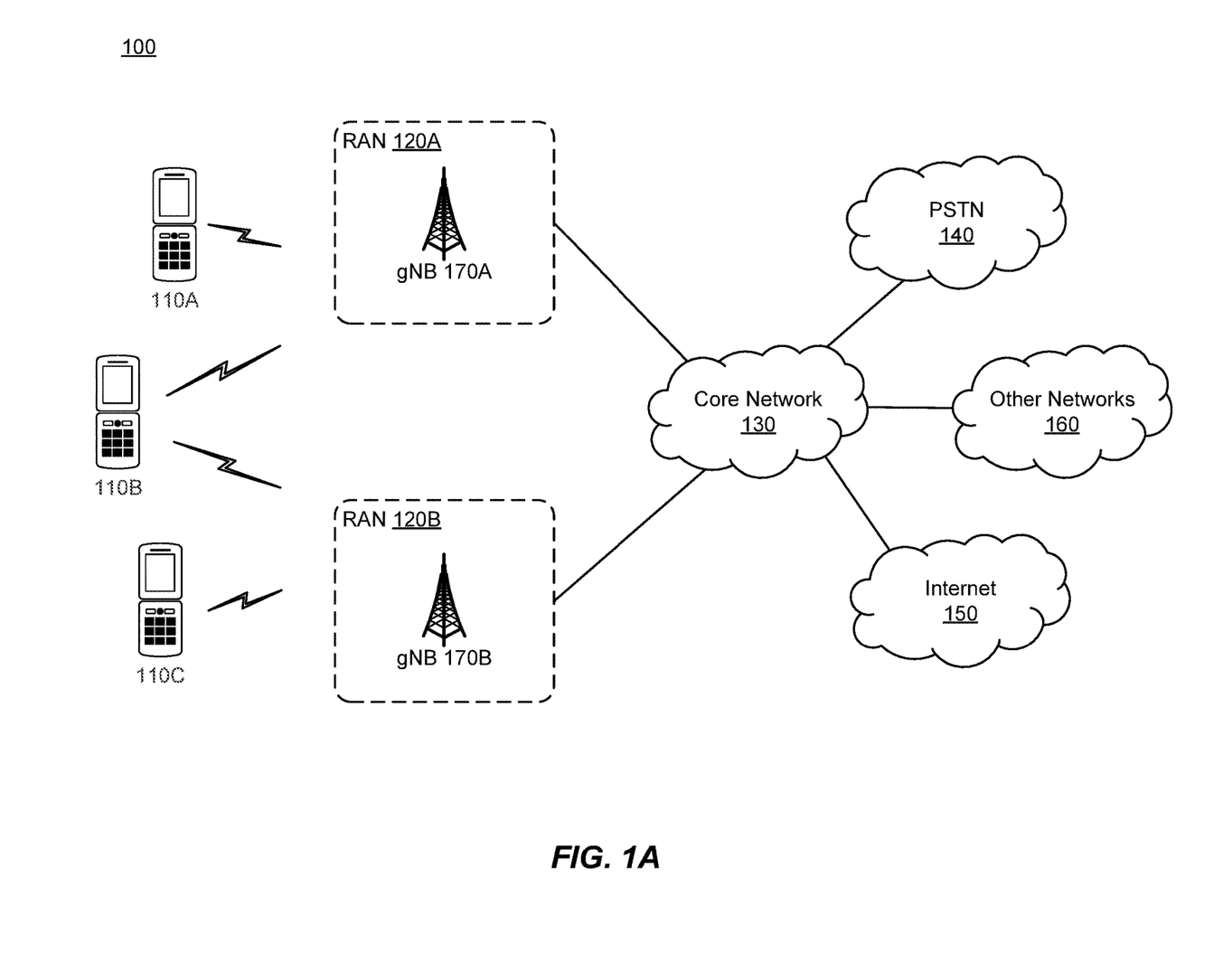
FIG. 1A illustrates a wireless network for communicating data.

FIG. 1A illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station (BS) which employs orthogonal frequency-division multiplexing (OFDM) and/or non-OFDM and a transmission time interval (TTI) shorter than 1 millisecond (ms) (e.g., 100 or 200 microseconds (µs)) to communicate with the communication devices. In general, a base station may also be used to refer any of the evolved nodeB (eNB) and the 5G base station (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement Universal Mobile Telecommunications System (UMTS), High Speed Packet Access (HSPA), or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a millimeter wave (mmW) CP) or a base station 170 capable of mmW communication (e.g., a mmW base station). The mmW APs may transmit and receive signals in a frequency range, for example, from 24 gigaHertz (GHz) to 100 GHz, but are not required to operate throughout this range. As used herein, the term base station is used to refer to a base station and/or a wireless access point.

Although FIG. 1A illustrates one example of a communication system, various changes may be made to FIG. 1A.

For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, personal digital assistant (PDA), iPad, tablet, mobile terminals, smart phones, laptop embedded equipped (LEE), laptop mounted equipment (LME), and universal serial bus (USB) dongles.

Figure 1B:
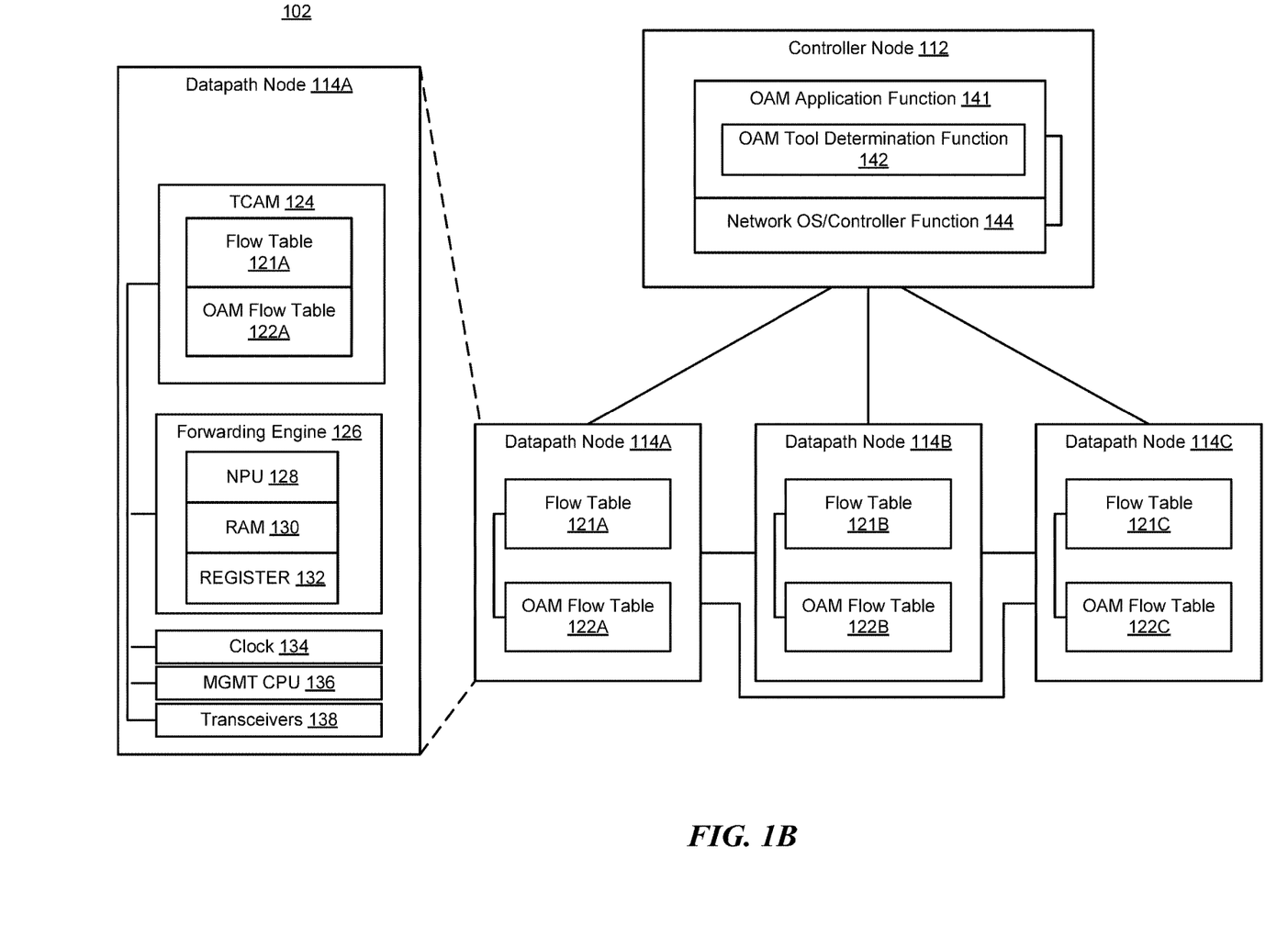
FIG. 1B illustrates an example communications system in accordance with the disclosed technology.

FIG. 1B illustrates an example network in which operations, administration and management functions may be implemented. Software defined networking (SDN) generally refers to any network where forwarding plane functionality (or data plane functionality) is implemented in a plurality of network nodes (or datapath nodes) under the control of control plane functionality implemented in a separate network node, such as a controller node. An example of an SDN architecture, or specification, is the OpenFlow Switch Specification, version 1.1.0 (hereinafter "OpenFlow Switch Specification"), available from the OpenFlow Switch Consortium. It is appreciated that OpenFlow Switch Specification is a non-limiting example and that any network in which forwarding plane functionality is separate from control plane functionality may be implemented.

An OAM function, as used herein, refers to any function(s) that may be implemented in conjunction with a flow in a network for purposes of OAM of the flow, or of the network in which the flow exists. Non-limiting examples of OAM functions include functions for proactive or on-demand fault management, such as continuity checks, loopbacks, and link traces; and functions for on-demand or proactive performance measurements, such as loss measurements, delay measurements, or throughput measurements. In the context of an Ethernet network, specific non-limiting examples of OAM functions include continuity checks for fault detection, loopback messages for fault verification, and multicast link trace messages for performing path discovery and fault isolations. Examples of Ethernet service performance measurement OAM functions include delay measurement and loss measurement. In the context of a Multiprotocol Label Switching (MPLS) network, non-limiting examples of OAM functions include label-switched path (LSP) ping functions for providing basic connectivity checks, which may be run periodically or on-demand, traceroute functionality, and loopback functionality. While specific examples of OAM functions have been provided, the embodiments are not limited to the implementation of any particular OAM function, and may be used to implement any desired function with respect to the OAM of a flow, or of a network in which the flow exists.

As illustrated, the network 102 includes a controller node 112 and one or more datapath nodes 114A-114C. It is appreciated that while the network 102 may include multiple controller nodes 112 and numerous datapath nodes 114A-114C, for purposes of discussion one controller node 112 and three datapath nodes 114A-114C have been illustrated. Each of the datapath nodes 114A-114C is in communication with the controller node 112 via a communication link, as well as in communication with each other via communication links. The datapath nodes 114A-114C may include respective flow tables 121A-121C. The flow tables 121A-121C may maintain information about each flow handled by the respective datapath node 114A-114C. The term "flow"

refers to a path of data packets through the network 102 communicated between a source node (not illustrated) and a destination node (not illustrated). Each datapath node 114A-114C may be associated with many flows, and typically processes such flows under the control of the controller node 112.

In one embodiment, each of the datapath nodes 114A-114C also includes an OAM structure such as an OAM flow table 122A-122C, each of which stores information regarding OAM functionality implemented by the respective datapath node 114A-114C in conjunction with a particular flow. Other elements of the datapath nodes 114A-114C may include a ternary content-addressable memory (TCAM) 124 in which the flow table 121A and the OAM flow table 122A are implemented. In one embodiment, the datapath node 114A also includes a forwarding engine 126 for handling the forwarding of packets associated with flows in accordance with the flow table 121A.

The forwarding engine 126 includes one or more network processing units (NPUs) 128, a random access memory (RAM) 130, which may be used, for example, to store software instructions associated with an OAM tool for implementing an OAM tool function in conjunction with a flow, and one or more registers 132. The datapath node 114A may also include a clock 134, which is used, for example, to generate timestamps associated with packets generated or processed by an OAM tool. A management central processing unit (CPU) 136 may be used for overall control and management of the datapath node 114A. The datapath node 114A may also include one or more transceivers 138 configured to communicate via the communication links.

The controller node 112 may include an OAM application function 141 that implements the OAM functionality described with respect to the controller node 112. The OAM application function 141 may include an OAM tool determination function 142, which determines OAM tools for communication to respective datapath nodes 114A-114C. A network operating system (OS) and controller function 144 may also be responsible for the overall functionality of the controller node 112 and communication with the datapath nodes 114A-114C.

Figure 2A:
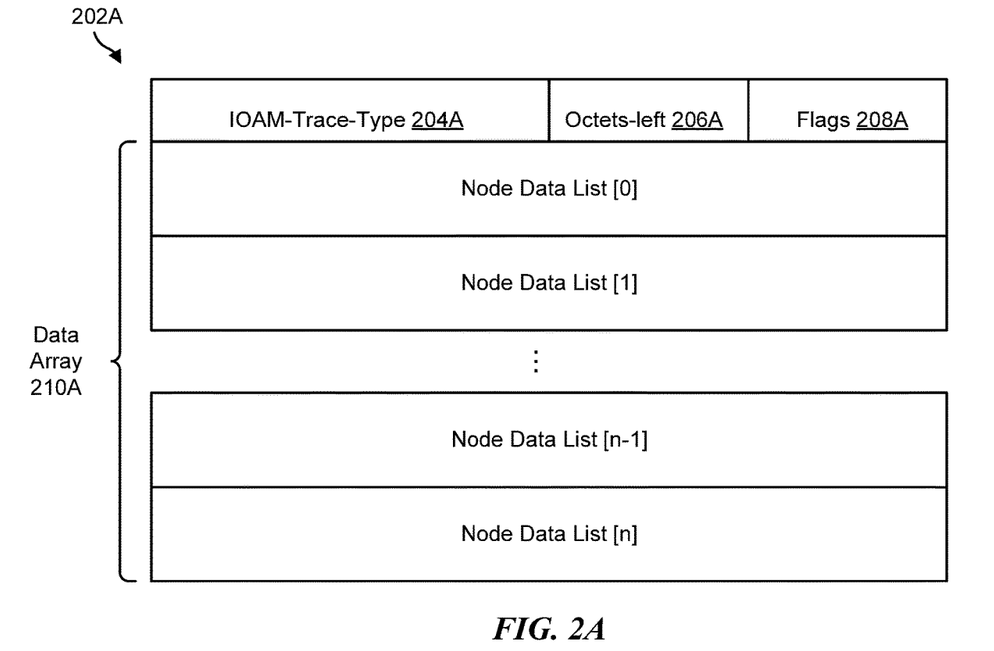
FIGS. 2A and 2B illustrate embodiments of data fields in OAM inserted into data packets.
Figure 2B:
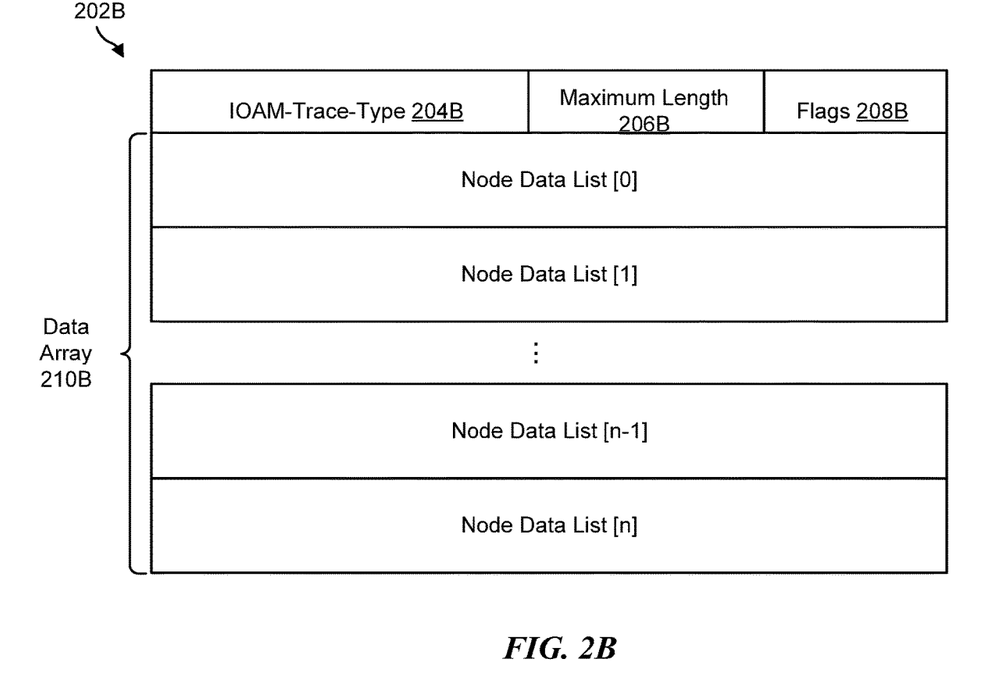

FIGS. 2A and 2B illustrate embodiments of data fields in OAM data inserted into data packets. In particular, the data fields depicted in the drawings define "in-situ" OAM (IOAM), in which the IOAM records OAM information within a data packet of the network while the packet traverses a particular network domain. In-situ generally refers to OAM data being added to the data packets in the network, as opposed to being propagated separately as an OAM packet. That is, the OAM data piggybacks on the data packets traversing the network. It is appreciated that throughout this document, the term IOAM and OAM may be used synonymously to mean data that is added to the data packets in the network. It is appreciated that the OAM data may be transported by a variety of transport protocols, including but not limited to, Network Services Headers (NSH), Segment Routing, Virtual Extensible Local Area Network-Generic Protocol Extension (VXLAN-GPE), Geneve, Internet Protocol version 6 (IPv6), or Internet Protocol version 4 (IPv4).

IOAM affords at least the following capabilities: (1) a flexible data format to allow different types of information to be captured as part of an in-situ OAM operation, including but not limited to path tracing information, operational and telemetry information such as timestamps, sequence numbers, or even generic data such as queue size, geo-location of the node that forwarded the packet, etc., (2) a data format to express node as well as link identifiers to record the path a packet takes with a fixed amount of added data, (3) the ability to determine whether any nodes were skipped while recording in-situ OAM information (i.e., in-situ OAM is not supported or not enabled on those nodes), (4) the ability to actively process information in the packet, for example to prove in a cryptographically secure way that a packet really took a pre-defined path using some traffic steering method such as service chaining or traffic engineering, (5) the ability to include OAM data beyond simple path information, such as timestamps or even generic data of a particular use case, and (6) the ability to carry in-situ OAM data in various different transport protocols.

IOAM is also a network domain focused feature where the network domain includes one or more network elements or entities within a single administration, for example, as depicted in FIG. 1. In another example, a network domain can include an enterprise campus using physical connections between elements or an overlay network using virtual connections or tunnels for connectivity between elements. The network domain itself, as noted above, is defined by its perimeter or edge, where an operator of the domain includes provisions to ensure that the IOAM data stays within the specific domain.

As eluded to above, IOAM data is added to a packet upon entering the IOAM domain and is removed from the data packet when exiting the IOAM domain. IOAM data fields are added to or removed from traffic (i.e., data packets traversing the network) by the elements which form the edge of a domain (e.g., source edge router). Within the IOAM domain, the OAM data may be updated by network elements that the data packet traversed. As data packets traverse the network, tracing data is collected at every node. To optimize tracing, two separate options are employed: (1) pre-allocated trace option—which includes data fields with pre-allocated space for each network element to populate its information, and (2) incremental trace option—which includes data fields where each network element allocates and pushes its data immediately following the option header.

Turning to FIG. 2A, the figure depicts an example of an IOAM pre-allocated trace option header 202A. The IOAM pre-allocated trace option header 202A includes data fields including an IOAM Trace Type 204A, an Octets-left 206A, Flags 208A, and Data Array 210A that contains Node Data List [0]-Node Data List [n]. The IOAM Trace Type 204A is a sixteen (16) bit identifier which specifies the data types (or data items) used in the node data list [0]-[n]. Of relevance to this disclosure, bit 7 of the IOAM Trace Type, when set, indicates the presence of a variable length Opaque State Snapshot field. While this data field can be used to store arbitrary data, the data is difficult to be standardized, thus requiring another scheme to decode the data, which may lead to low data plane performance. It is also noted that bits 11-15 are undefined in the current format. The Octets-left 206A is an eight (8) bit data space that remains available for recording network element data. The Flags 208A is also an eight (8) bit field that defines several flags, including overflow and loopback flags. The data array 210A, which includes node data lists [0]-[n], is a variable length field, the type of which is determined by the IOAM Trace Type 204A representing the nth network element (node) data in the node data list.

With reference to FIG. 2B, the figure depicts an example of an IOAM incremental trace option header 202B. The header includes data fields including an IOAM Trace Type 204B, a Maximum length 206B, Flags 208B and Data Array 210B which contains Node Data List [0]-Node Data List [n]. Similar to the IOAM Trace Type in pre-allocated trace option header 202A, the IOAM incremental trace type option header 202B has a sixteen (16) bit identifier (IOAM Trace Type 204B) which specifies the data types (or data items) used in the node data list [0]-[n]. As noted above, bit 7 of the IOAM Trace Type, when set, indicates the presence of a variable length Opaque State Snapshot field. While this data field can be used to store arbitrary data, the data is difficult to be standardized, thus requiring another scheme to decode the data, which may lead to low data plane performance. It is also noted that bits 11-15 remain undefined. The Maximum Length 206B is a field that is an eight (8) bit integer and specifies the maximum length of the node data list [n]. The Flags 208B is also an eight (8) bit field that defines several flags, including overflow and loopback flags. The data array 210B, which includes node data lists [0]-[n], is a variable length field, the type of which is determined by the IOAM Trace Type 204A representing the nth network element (node) data in the node data list.

Requirements for IOAM may be found in "Requirements for In-situ OAM draft-brockners-inband-oam-requirements-03," Network Working Group, Internet-Draft, Mar. 13, 2017, and data fields for In-situ OAM may be found in "Data Fields for In-situ OAM draft-brockners-inband-oam-data-04," ippm, Internet Draft, Mar. 29, 2017, the contents of which are hereby incorporated by reference.

Figure 3A:
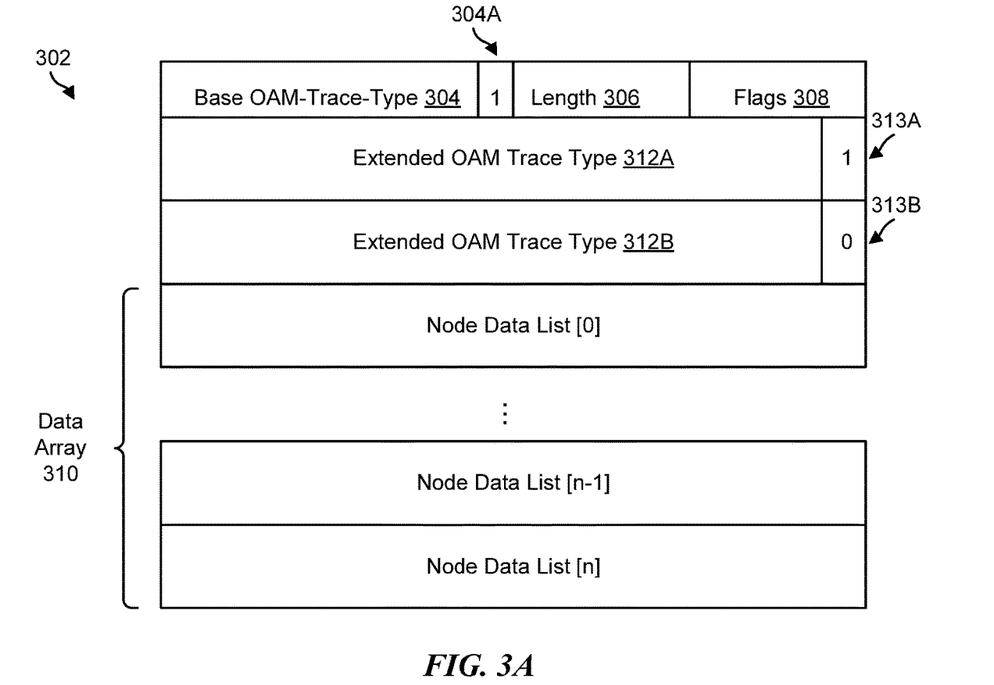
FIGS. 3A and 3B illustrate an example OAM header with an extended OAM trace type bitmap field.
Figure 3B:
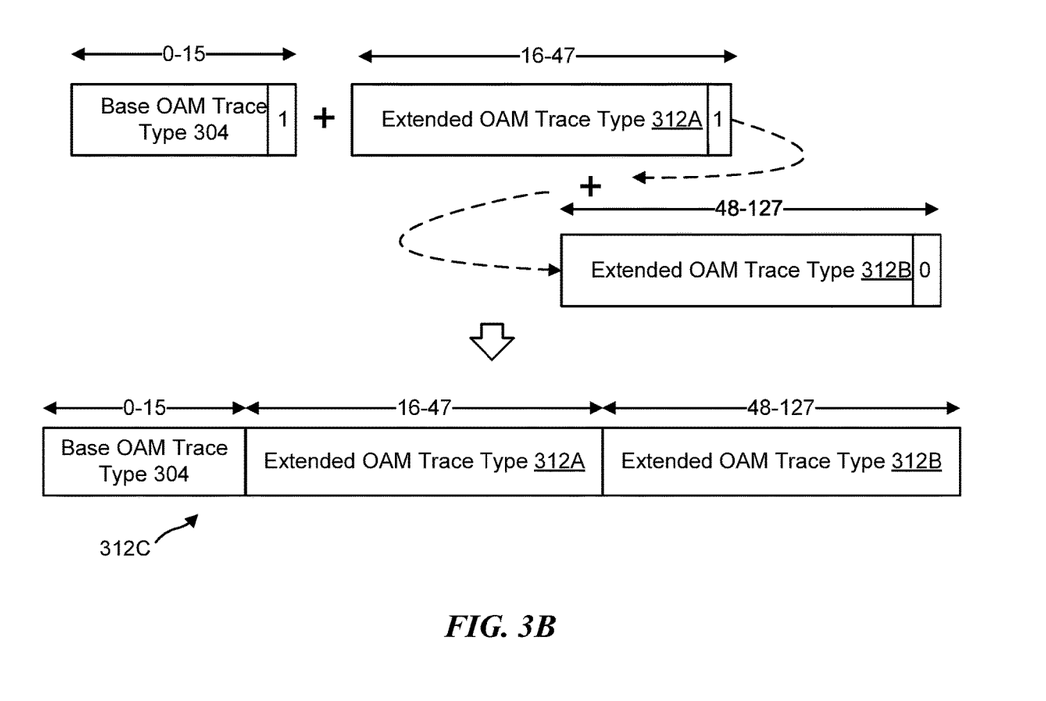

FIGS. 3A and 3B illustrate an example OAM header with an extended OAM trace type bitmap field. As discussed with reference to FIGS. 2A and 2B, the OAM header provides a sixteen bit Base OAM Trace Type 304 field, where each bit in the field may specify which data types are used in the node data list [0]-[n]. This limits the number of data types to sixteen.

With reference to FIG. 3A, the OAM header 302 includes a Base OAM Trace Type 304 field, a Length 306 field, a Flags 308 field, an Extended OAM Trace Type 312A and 312B field and Node Data List [0]-[n] fields (together forming Data Array 310). The number of data types in the OAM header 302 may be expanded or extended by using the last bit in the Base OAM Trace Type 304 as an indicator 304A to indicate the existence of another OAM trace type bitmap, such as Extended OAM Trace Type 312A and Extended OAM Trace Type 312B. In one embodiment, and as depicted, the Extended OAM Trace Type(s) is(are) added prior to the node data list [0]-[n].

While the OAM header 302 as depicted shows two extended bitmaps (Extended OAM Trace Type 312A and Extended OAM Trace Type 312B), it is appreciated that any number of extended bitmaps may be added (or removed) to the OAM header 302 by placement of an indicator set to '1' in the last bit of the prior trace type. Likewise, placing an indicator set to '0'; in the last bit of the prior trace type indicates that no further trace types will be added to the OAM header 302. (It is appreciated that although the depicted embodiments show the last bit of the trace type as the indicator, any bit in the trace type may be used). For example, in the depicted embodiment, the Base OAM Trace Type 304 has an indicator 304A that is set to '1', which specifies that an extended OAM Trace Type (in this case, Extended OAM Trace Type 312A) is added to the OAM header 302. The extended OAM Trace Type 312A also has an indicator 313A that is set to '1', specifying that a second extended OAM Trace Type (in this case, Extended OAM Trace Type 312B) is added to the OAM header 302. However, the Extended OAM Trace Type 312B has an indicator set to '0', which specifies that no additional (e.g., third) Extended OAM Trace Type is added.

In one embodiment, the Base OAM Trace Type 304 is sixteen (16) bits and includes the indicator bit as bit fifteen (15). The other bits (0-14) in the Base OAM Trace Type 304 remain unchanged and are defined according to "Data Fields for In-situ OAM draft-brockners-inband-oam-data-04." The Extended OAM Trace Types 312A and 312B, in the example embodiment, are thirty-two bits (0-31). The remaining fields in the OAM Header 302, such as Flags 308, node data list [0]-[n] (data array 310), etc., remain unchanged and are defined according to "Data Fields for In-situ OAM draft-brockners-inband-oam-data-04." However, it is appreciated that the bit length of the OAM Trace Types may vary.

In one embodiment, as Extended OAM Trace Types 312A and 312B are added to the OAM header 302, they are concatenated (linked together) with the Base OAM Trace Type 304 to form a single Extended OAM Trace Type 312C. As shown in FIG. 3B, and using the example OAM header 302 in FIG. 3A, the Base OAM Trace Type 304 is concatenated together with Extended OAM Trace Type 312A, which is concatenated together with Extended OAM Trace Type 312B to form the single Extended OAM Trace Type 312C. In the example, as the Base OAM Trace Type 304 is sixteen bits (including indicator 304A), and each of the Extended OAM Trace Types 312A and 312B are thirty-two (32) bits in length (including respective indicators 313A and 313B), the concatenated OAM Trace Type 312C is one hundred and twenty-seven bits (127) in length (i.e., 16 bit Base OAM trace type+first 32 bit Extended Trace Type+ second 32 bit Extended Trace Type). Forming the concatenated OAM Trace Type 312C in this manner allows each bit to represent a single (and different) data type.

In one embodiment, data stored in the OAM header 302 may have different sizes. For example, the size of the data (data items) is not limited to 4 bytes (or a multiple of 4 bytes). Having data of varying size allows data to be packed such that it saves storage space (unused bits of data remain available for storage of additional data instead of being padded). Moreover, the data stored at a node may be packed in an order that is the same order as listed in the OAM Trace Type bitmap. However, while allowing different data types to have different lengths may be beneficial for purposes of storage (saves space), doing so complicates data alignment and packing of the data into the OAM header 302.

In one embodiment, to avoid complicating data alignment and packing of data at the node into the node data list [0]-[n] of OAM header 302, a maximum number of data types that can be carried per data packet may be defined. In this case, the node can calculate the position of a data item in the node based on the length of each data item, which allows the node to more readily insert data into a data packet when requested. Any offset for each data item stored in the node can be pre-calculated and carried in the OAM header 302. For example, where the length of data is a multiple of 2 bytes, each data may be padded to have a length that is a multiple of 4 bytes. If each data item's length is a multiple of 4, each data item is 4-byte aligned in a data block. Each data item's offset in the block is therefore an integer in the unit of 4-bytes. On the other hand, if each data item has an arbitrary length, the offset of each item can start from any octet in any 4-byte word. This not only requires more bits to represent the offset value, but also makes the data insertion operation more difficult (e.g., a data shift and alignment will be required).

The overhead (of padding the length of the data items) can be justified by the overall space saving of the node data list. Otherwise, each data's offset in the node must be calculated in each device, with the help of a table which stores the size of each data type. For example, if the offset of each data item in the block is known, the data item can be directly added it to its location once the data item is available. An offset table calculated from the data type size and the bitmap may be used to achieve this. Additionally, in one embodiment, the bitmap may be arranged to reflect the data availability order in the system (e.g., the bit for egress_if_id must be after the bit for ingress_if_id), so in a pipeline-based system, the required data can be packed one after the other. For example, if the data items are available in the order as they appear in the bitmap, then the data items may be inserted into the data block one by one, with the next one following the previous one. In this case, no offset calculation is needed, only the previous data item in the data block is tracked.

Figure 3C:
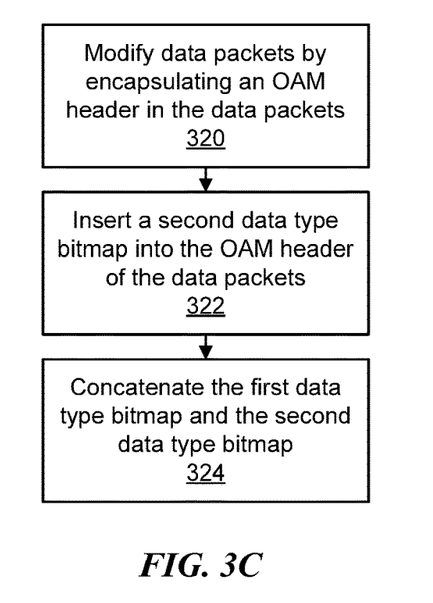
FIG. 3C illustrates a flow diagram in accordance with the disclosed embodiments.

FIG. 3C illustrates a flow diagram in accordance with the disclosed embodiments. In the description that follows, and for purposes of discussion, the process is implemented using a source edge node of the OAM domain. However, it is appreciated that the process is not limited to such source edge node and that any component described herein may implement the process.

As data packets arrive at the source edge node of an OAM domain, the source edge node modifies the incoming data packets by encapsulating an operations, administration and maintenance (OAM) header in the data packets, at 320. The OAM header 302 includes a first data type bitmap, such as Extended OAM Trace Type 312A, having a first indicator, such as indicator 313A.

At 322, the source edge node inserts a second data type bitmap, such as Extended OAM Trace Type 312B, into the OAM header 302 of the incoming data packets based on an indication by the first indicator. In this case, the second data type bitmap extends a number of data types in the OAM header 302.

The Base OAM Trace Type 304 and any Extended OAM Trace Types (e.g., Extended Trace Types 312A and 312B) are then concatenated (linked) to form a single concatenated Extended OAM Trace Type 312C at 324.

Figure 4A:
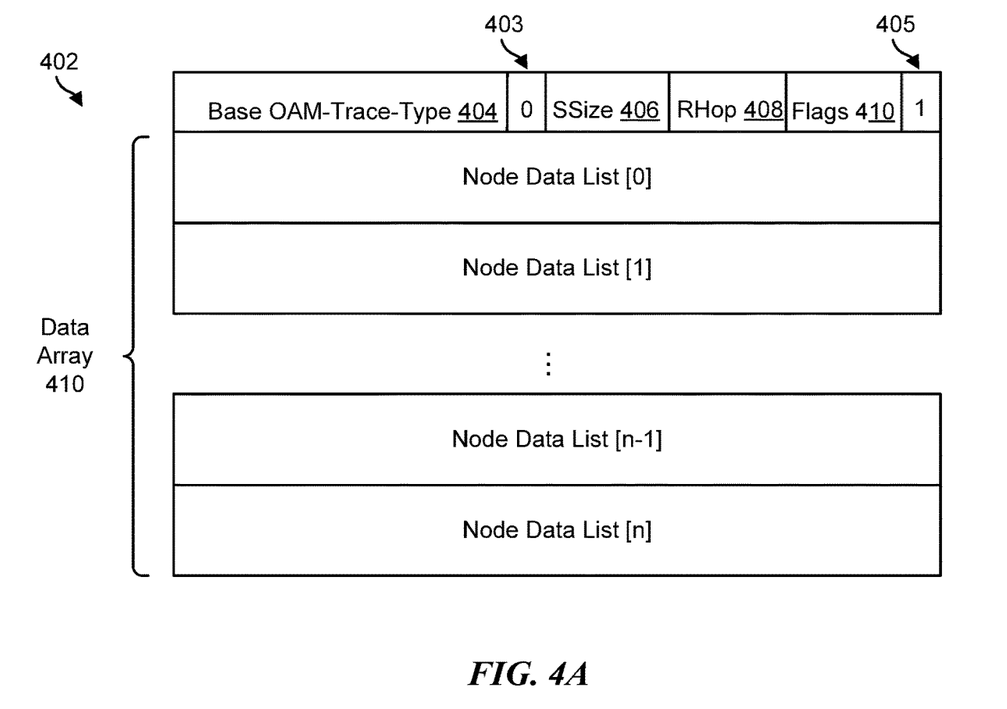
FIG. 4A illustrates an example segment-based OAM header.

FIG. 4A illustrates an example segment-based OAM header. As discussed with reference to FIGS. 2A and 2B, the OAM header provides includes a node data list [0]-[n]. The node data list [0]-[n] in the data packet is populated iteratively as the packet traverses the network, starting with the last entry of the array, i.e., node data list [n] is the first entry to be populated, node data list [n-1] is the second entry to be populated, and so forth.

The OAM header 402 includes a Base OAM Trace Type 404 field, a Segment Size (SSize) 406 field, Remaining Hops (RHop) 408 field, a Flags 410 field and Node Data List [0]-[n] (forming Data Array 410). The OAM header 402 also includes indicator 403, which is an extension indicator (as discussed above) that is set to '0', and indicator 405, which specifies that the OAM header 402 is segment based. When the indicator 405 is set to '1', the third byte (SSize and RHop) of the first word (Base OAM header) is partitioned into two 4-bit parts, where the first part (first 4 bits) is reserved to indicate the segment size (SSize) 406, and the second part (second 4 bits) is reserved to indicate the remaining hops (RHop) 408. Accordingly, the SSize 406 is limited to a maximum segment size of 15 bits.

Using this configuration, the total size of OAM data carried by a data packet traversing the network is limited by the maximum transmission unit (MTU), which is the largest size data packet allowed in the network. As the number of data types (defined in the Base OAM Trace Type 404) increases and the forwarding data path increases in length, the OAM header 402 may not have sufficient space to store OAM data being collected at the nodes in the forwarding data path. Moreover, even if the OAM header 402 has sufficient space to store OAM data, the overhead may be too large and network resources, such as bandwidth, may be consumed. For example, in a network having 16 bytes of data per node and a data path with a length of 10 hops, 160 bytes will be required in order to store the data.

To limit the amount of overhead in the network, and without sacrificing or losing any of the data to be collected along the data path, one embodiment provides a mechanism that prevents data from being added to the data packet after collecting data from a defined number of nodes. This may be accomplished, in one embodiment, by enabling data termination at any node in the data path (as opposed to conventional techniques which collect data from every node in the data path) using a segment based approach. For example, the data path may be partitioned into fixed segment sizes (SSize) 406 and the OAM packets may be allowed to collect data from the nodes within the fixed segment size, as opposed to the entire data path. When the OAM packet reaches the end of a segment (and data collection is terminated), the collected data (stored in the node data list [0]-[n]) is stripped off (removed or extracted). The stripped data may then be reported or stored for later reporting. For example, the collected data may be reported to the source edge node for collection, and then forwarded to a data collection entity, such as a management plane, at a later time. In another embodiment, the collected data may be reported directly to the collection entity. The OAM packet may then proceed to the next segment to continue to collect data. Each segment in the data path may be traversed by the data packets until the entire data path has been traversed (an example of which is discussed with reference to FIG. 4B below). Applying this technique, the OAM header 402 size is limited in the amount of data it carries regardless of the size of data at each node and irrespective of the forwarding data path length.

Figure 4B:
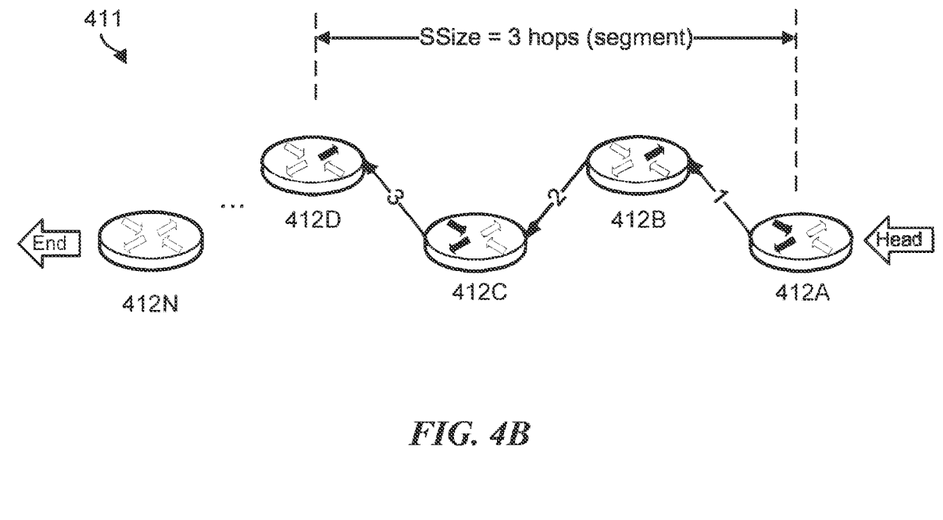
FIG. 4B illustrates an example OAM network with nodes in which data is collected in accordance with the disclosed embodiments.

FIG. 4B illustrates an example OAM network with nodes in which data is collected in accordance with the disclosed embodiments. As depicted, the OAM network 411 includes nodes 412A-412N, such as routers or access points. The nodes 412A-412N, which may include storage to cache data as the data propagates through the OAM network 411. The nodes 412A-412N may also be communicatively coupled and may be configured to process requests received from head and end nodes for accessing the data via clients, user devices, etc.

While working in a segment-based ("per hop") mode in a network, the segment size (SSize) 406 and the remaining hops (RHop) 408 may be added to the OAM header 402 at the source edge node, e.g., node 412A in FIG. 4B. Initially, RHop 408 is set to be equal to the SSize 406. When data packet is received at a node of the OAM network and RHop 408 is not equal to zero, the node data is collected and added to the node data list [0]-[n] at the corresponding location, and RHop 408 is decremented by 1. If RHop 408 is equal to zero when receiving the data packet at the node, the node clears (in pre-allocated trace option, FIG. 2A) or removes (in incremental trace option, FIG. 2B) the node data list [0]-[n] and resets the RHop 408 to the SSize 406 (so that the data packet may traverse the next segment). However, prior to removing or clearing the node data list [0]-[n], the node will add the node data to the node data list [0]-[n] and copy the node data from the OAM header 402. The node data list [0]-[n] copied from the OAM header 402 may then be extracted for encapsulation and reported to a controller or edge node.

In one example, as OAM packets traverse the OAM network 411, the data packets "hop" from node-to-node collecting the data. A hop is a path defined between two nodes, such as a source and destination node, of a flow's forwarding data path which is capable of processing the OAM data. For example, the path 1 between node 412A and node 412B is a hop. The segment size (i.e., the size of a segment on the forwarding data path), as discussed above, may also be defined as a fixed number of hops on the forwarding data path. For example, the drawing shows an OAM network in which the segment size (SSize) has been set to 3. Thus, when the OAM packet traverses the forwarding data path, data will be collected at each of nodes 412A, 412B and 412C (a segment of 3 hops). For instance, the OAM packet is propagated on the forwarding data path along paths 1, 2, and 3, beginning at node 412A and ending at node 412D.

In one embodiment, the size of the last segment may not be equal to the SSize. For example, in the disclosed example, the SSize is equal to 3. Thus, each segment has 3 hops. However, the last segment on the forwarding data path may have less than 3 hops.

Figure 4C:
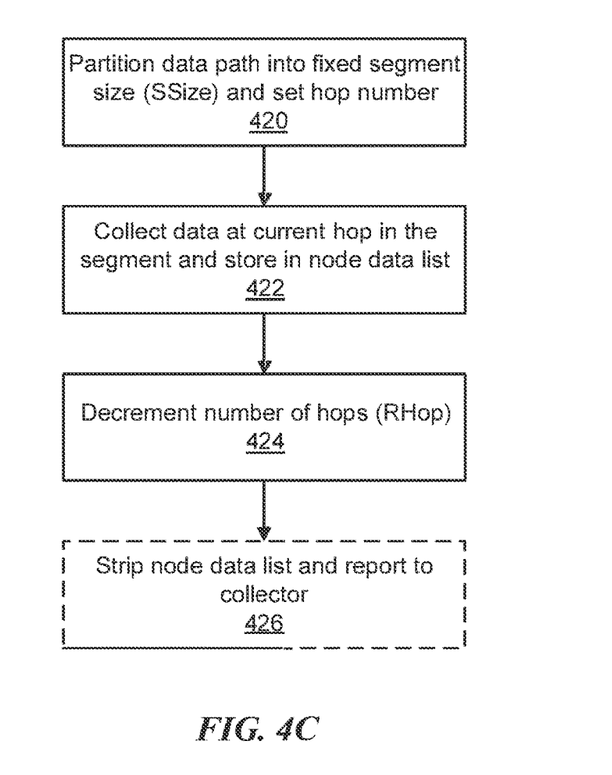
FIG. 4C illustrates a flow diagram in accordance with the disclosed embodiments.

FIG. 4C illustrates a flow diagram in accordance with the disclosed embodiments. In the description that follows, and for purposes of discussion, the process is implemented using a source edge node of the OAM domain. However, it is appreciated that the process is not limited to such source edge node and that any component described herein may implement the process.

The source edge node modifies incoming data packets by encapsulating an operations, administration and maintenance (OAM) header 402 in the data packets. The OAM header 402 includes, but is not limited to, a segment size, a hop count and a node data list. The data path is then partitioned into fixed segment sizes (SSizes) 406 and the hop count (RHop) 408 is set to be equal to the fixed SSizes 406, at 420.

At 422, data is collected at each node in the data path for the fixed SSize 406 and the collected data is stored in the node data list [0]-[n]. The hop count (RHop) 408 at each node in the data path is decreased as the data packet traverses the data path, at 424, and the node data list [0]-[n] is collected at each node in the data path.

At 426, the extracted node data list [0]-[n] is optionally reported to a collection entity in response to the hop count being zero.

The following examples demonstrate scenarios in which segment-based OAM may be implemented. In a first example, a segment OAM can be used to detect at which node in a segment the data packet may be dropped (i.e., at which node the data nod list is cleared). If the SSize is set to 1, the exact drop node may be identified using the SSize 406 and RHop 408. As discussed above, the OAM data before clearing the data may be retained and reported to another entity. In a second example, the path MTU allows the addition of at most k node data into the node data list [0]-[n] to avoid fragmentation. Accordingly, the SSize 406 is set to k. At each hop where RHop 408 is zero, the node data list [0]-[n] is retrieved and sent in a standalone packet. In a third example, a flow contains primarily short data packets that travel along a lengthy path. Accordingly, it would be inefficient to maintain a large node data list [0]-[n] in the OAM packet 402 since the network bandwidth utilization rate is low. In this case, segment OAM can be used to limit the ratio of the OAM data to the flow packet payload. Finally, in a fourth example, the network allows at most n bytes for the OAM data. However, there is a tradeoff between the number of data types that can be collected and the number of hops for collecting data. In this case, the SSize 406 should meet the application's data requirement (i.e., SSize*Node Data Size<n).

Figure 5:
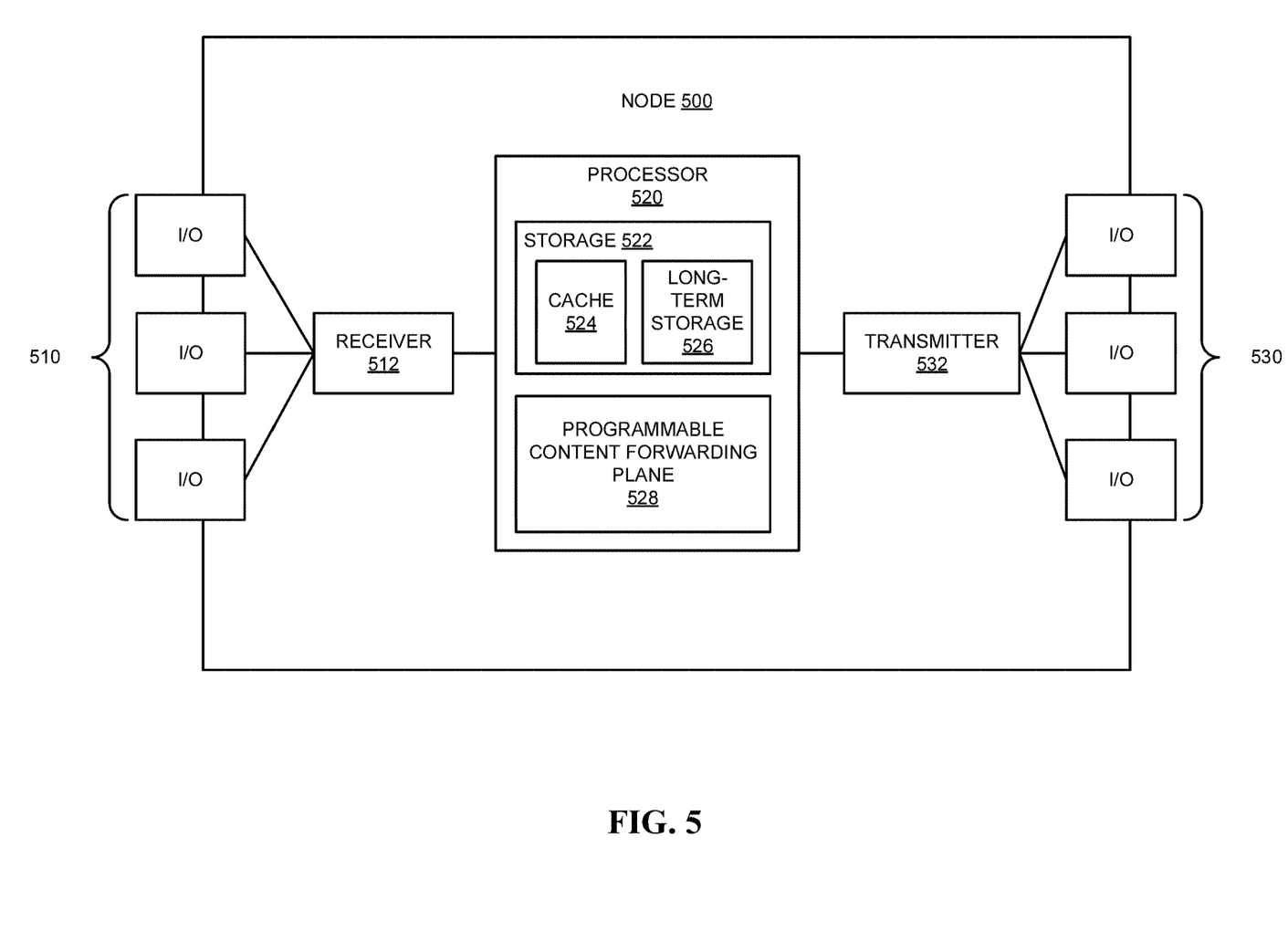
FIG. 5 illustrates an embodiment of a router in accordance with embodiments of the disclosure

FIG. 5 illustrates an embodiment of a router in accordance with embodiments of the disclosure. The node (e.g., a router) 500 may be, for example, a network element in (FIG. 1) or any other network element or node as described above. The node 500 may comprise a plurality of input/output ports 510/530 and/or receivers (Rx) 512 and transmitters (Tx) 532 for receiving and transmitting data from other nodes, a processor 520 (or content aware unit), including a storage 522 and programmable content forwarding plane 528, to process data and determine which node to send the data. The node 500 may also receive Interest messages and Data messages as described above. Although illustrated as a single processor, the processor 520 is not so limited and may comprise multiple processors. The processor 520 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 520 may be configured to implement any of the schemes described herein, such as the processes illustrated in FIGS. 3C and 4C using any one or combination of steps described in the embodiments. Moreover, the processor 520 may be implemented using hardware, software, or both.

The storage 522 (or memory) may include cache 524 and long-term storage 526, and may be configured to store routing tables, forwarding tables, or other tables or information disclosed herein. Although illustrated as a single storage, storage 522 may be implemented as a combination of read only memory (ROM), random access memory (RAM), or secondary storage (e.g., one or more disk drives or tape drives used for non-volatile storage of data).

The programmable content forwarding plane 528 may be configured to implement content forwarding and processing functions, such as at an application layer or layer 3 (L3), where the content may be forwarded based on content name or prefix and possibly other content related information that maps the content to network traffic. Such mapping information may be maintained in one or more content tables (e.g., content store (CS), pending interest table (PIT), forwarding information base (FIB)) at the processor 520. The programmable content forwarding plane 528 may interpret user requests for content and accordingly fetch content, e.g., based on meta-data and/or content name (prefix), from the network or other content routers and may store the content, e.g., temporarily, in storage 522. The programmable content forwarding plane 528 may then forward the cached content to the user. The programmable content forwarding plane 528 may be implemented using software, hardware, or both and may operate above the IP layer or L2.

Figure 6:
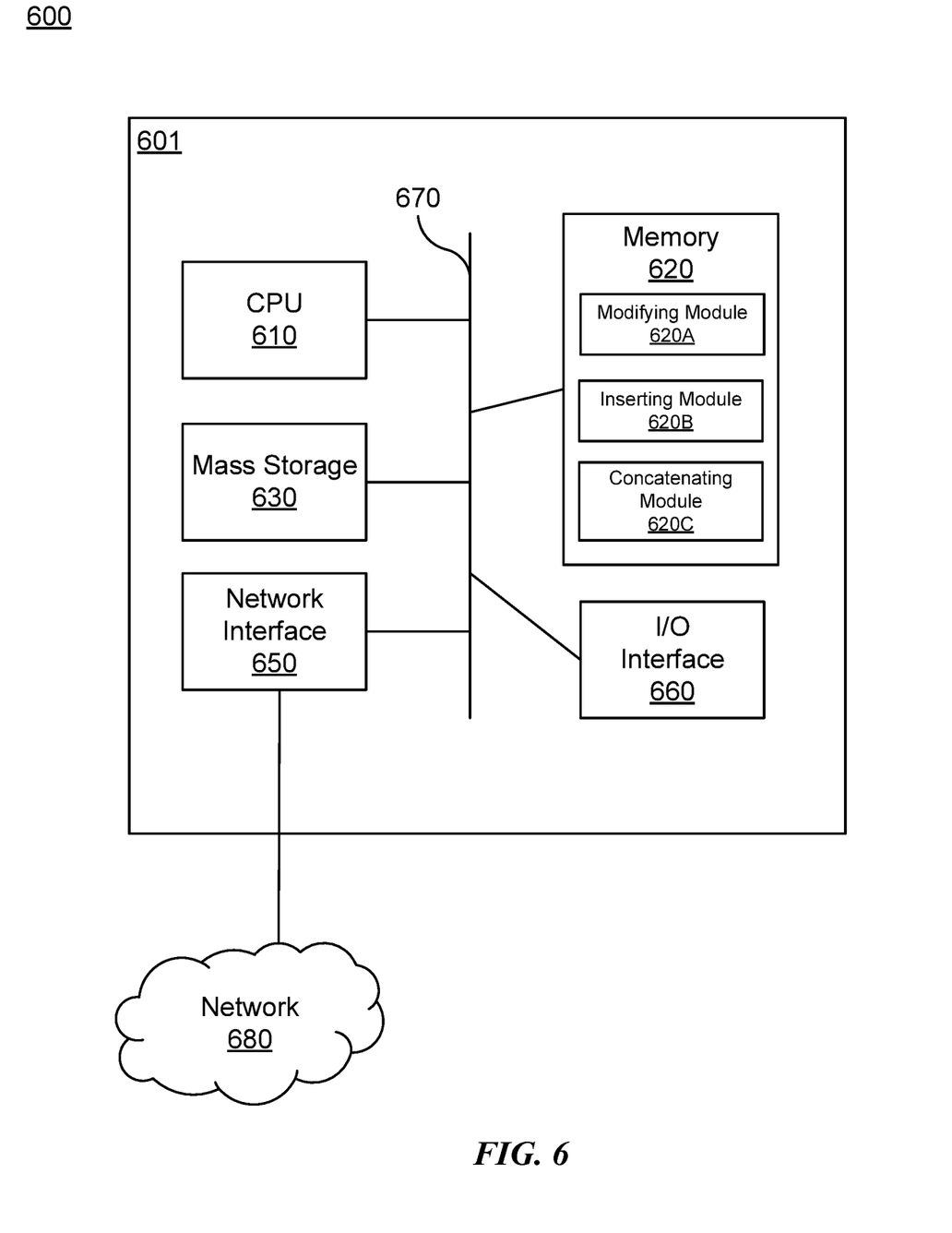
FIG. 6 illustrates a block diagram of a network system that can be used to implement various embodiments.

FIG. 6 is a block diagram of a network device 600 that can be used to implement various embodiments. Specific network devices may utilize all of the components shown, or only a subset of the components, and levels of integration may vary from device to device. Furthermore, the network device 600 may contain multiple instances of a component, such as multiple processing units, processors, memories, transmitters, receivers, etc. The network device 600 may comprise a processing unit 601 equipped with one or more input/output devices, such as network interfaces, storage interfaces, and the like. The processing unit 601 may include a central processing unit (CPU) 610, a memory 620, a mass storage device 630, and an I/O interface 660 connected to a bus 670. The bus 670 may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. In one embodiment, the memory 620 includes a modifying module 620A modifying data packets by encapsulating an operations, administration and maintenance (OAM) header in the data packets, and insertion module 620B inserting a second data type bitmap into the OAM header of the data packets based on an indication by the first indicator and a concatenating module 620C concatenating the first data type bitmap and the second data type bitmap.

The mass storage device 630 may comprise any type of storage device configured to store data, programs, and other information and to make the data, programs, and other information accessible via the bus 670. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in, and sold with, the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of tracing implemented by a node in a network, comprising:
   encapsulating a packet with a header, the header including a trace type field having an indicator;
   setting the indicator in the trace type field to a value to indicate that the header includes an additional trace type field; and
   transmitting the packet as encapsulated to another node in the network.

2. The method of claim 1, wherein the indicator is an indicator bit, and wherein the indicator bit is a last bit of the trace type field.

3. The method of claim 1, wherein the value is one.

4. The method of claim 1, wherein the header comprises an operations, administration and maintenance (OAM) header.

5. The method of claim 1, wherein the trace type field is a base operations, administration and maintenance (OAM) trace type field.

6. The method of claim 1, wherein the trace type field is an extended operations, administration and maintenance (OAM) trace type field.

7. The method of claim 1, wherein the additional trace type field is an extended operations, administration and maintenance (OAM) trace type field.

8. A method of tracing implemented by a node in a network, comprising:
   receiving a packet encapsulated with a header, the header including a trace type field having an indicator;
   determining whether the indicator has a first value or a second value, the first value indicating that the header includes an additional trace type field, the second value indicating that the header does not include the additional trace type field; and
   processing the header to determine which data types are in a node data list of the packet based on the determination.

9. The method of claim 8, wherein the indicator is an indicator bit, and wherein the indicator bit is a last bit of the trace type field.

10. The method of claim 8, wherein the first value is a one and the second value is zero.

11. The method of claim 8, wherein the header comprises an operations, administration and maintenance (OAM) header.

12. The method of claim 8, wherein the trace type field is a base operations, administration and maintenance (OAM) trace type field and the additional trace type field is an extended OAM trace type field.

13. The method of claim 12, further comprising concatenating the base OAM trace type field and the extended OAM trace type field.

14. A node in a network, comprising:
   a memory storing instructions;
   one or more processors coupled to the memory, the one or more processors configured to execute the instructions to cause the node to:
      encapsulate a packet with a header, the header including a trace type field having an indicator;
      set the indicator in the trace type field to a value to indicate that the header includes an additional trace type field; and
      transmit the packet as encapsulated to another node in the network.

15. The node of claim 14, wherein the indicator is an indicator bit, and wherein the indicator bit is a last bit of the trace type field.

16. The node of claim 14, wherein the value is one.

17. The node of claim 14, wherein the header comprises an operations, administration and maintenance (OAM) header.

18. The node of claim 14, wherein the trace type field is a base operations, administration and maintenance (OAM) trace type field.

19. The node of claim 14, wherein the trace type field is an extended operations, administration and maintenance (OAM) trace type field.

20. The node of claim 14, wherein the additional trace type field is an extended operations, administration and maintenance (OAM) trace type field.

* * * * *

UNITED STATES PATENT AND TRADEMARK OFFICE
CERTIFICATE OF CORRECTION

| | | |
|---|---|---|
| PATENT NO. | : 11,817,996 B2 | Page 1 of 1 |
| APPLICATION NO. | : 17/355989 | |
| DATED | : November 14, 2023 | |
| INVENTOR(S) | : Haoyu Song et al. | |

It is certified that error appears in the above-identified patent and that said Letters Patent is hereby corrected as shown below:

On the Title Page

Page 2, item (56) References Cited, U.S. Patent Documents:
Insert -- 20080049626 2/2008 Bugenhagen --.

Signed and Sealed this
Ninth Day of January, 2024

Katherine Kelly Vidal
*Director of the United States Patent and Trademark Office*